US009330172B2

(12) United States Patent
Elsner et al.

(10) Patent No.: US 9,330,172 B2
(45) Date of Patent: May 3, 2016

(54) AUDIO/VIDEO ARCHIVING SYSTEM AND METHOD

(75) Inventors: Robert Elsner, Ft. Collins, CO (US); Josh Stumbo, Cheyenne, WY (US)

(73) Assignee: EchoStar Technologies LLC, Englewood, CO (US)

( * ) Notice: Subject to any disclaimer, the term of this patent is extended or adjusted under 35 U.S.C. 154(b) by 641 days.

(21) Appl. No.: 12/568,379

(22) Filed: Sep. 28, 2009

(65) Prior Publication Data

US 2010/0082635 A1 Apr. 1, 2010

Related U.S. Application Data

(60) Provisional application No. 61/100,982, filed on Sep. 29, 2008.

(51) Int. Cl.

*G06F 17/30* (2006.01)
*H04N 7/173* (2011.01)
*H04N 21/231* (2011.01)
*H04N 21/2665* (2011.01)

(52) U.S. Cl.

CPC ...... *G06F 17/30858* (2013.01); *G06F 17/3074* (2013.01); *G06F 17/30781* (2013.01); *H04N 7/17318* (2013.01); *H04N 21/23109* (2013.01); *H04N 21/2665* (2013.01)

(58) Field of Classification Search

USPC .......................................... 707/741; 709/219
See application file for complete search history.

(56) References Cited

U.S. PATENT DOCUMENTS

| | | | | |
|---|---|---|---|---|
| 6,266,657 | B1 * | 7/2001 | deVries et al. | 707/741 |
| 6,536,043 | B1 * | 3/2003 | Guedalia | 725/90 |
| 2003/0084205 | A1 * | 5/2003 | Nakajima | 709/400 |
| 2006/0294540 | A1 * | 12/2006 | Perlman | 725/31 |
| 2008/0192661 | A1 * | 8/2008 | Hamamoto et al. | 370/310 |
| 2009/0165057 | A1 * | 6/2009 | Miller et al. | 725/68 |
| 2010/0290757 | A1 * | 11/2010 | Ariyoshi et al. | 386/241 |
| 2012/0159539 | A1 * | 6/2012 | Berberet et al. | 725/34 |

OTHER PUBLICATIONS

"Content Managers, LIVEcut Scheduler" retrieved from Harmonic Inc. internet site located at Http://harmonic.com/view_product.cfm?ID=352&navcode=101.102.100.200a352 on Dec. 29, 2009, 3 pages.

"Harmonic's On-Demand Delivery Platform" white paper, Apr. 2007, United States of America, 16 pages.

* cited by examiner

*Primary Examiner* — Son T Hoang
(74) *Attorney, Agent, or Firm* — Lowe Graham Jones PLLC

(57) ABSTRACT

A method of archiving audio/video content is presented. In the method, a plurality of audio/video content streams is received. Each of the received audio/video content streams is indexed according to time. Each of the indexed audio/video content streams is transferred to a data storage system for storage. A request for a portion of one of the stored audio/video content streams associated with a time period is received. The requested portion of the one of the stored audio/video content streams is retrieved from the data storage system. The requested portion of the one of the stored audio/video content streams is transferred.

21 Claims, 7 Drawing Sheets

200

202 RECEIVE A PLURALITY OF AUDIO/VIDEO CONTENT STREAMS

204 INDEX EACH OF THE RECEIVED AUDIO/VIDEO CONTENT STREAMS ACCORDING TO TIME

206 TRANSFER EACH OF THE INDEXED AUDIO/VIDEO CONTENT STREAMS TO A DATA STORAGE SYSTEM FOR STORAGE

208 RECEIVE A REQUEST FOR A PORTION OF ONE OF THE STORED AUDIO/VIDEO CONTENT STREAMS

210 RETRIEVE THE REQUESTED PORTION OF THE ONE OF THE STORED AUDIO/VIDEO CONTENT STREAMS FROM THE DATA STORAGE SYSTEM

212 TRANSFER THE REQUESTED PORTION OF THE ONE OF THE STORED AUDIO/VIDEO CONTENT STREAMS

AUDIO/VIDEO ARCHIVING SYSTEM AND METHOD

RELATED APPLICATIONS

This application claims the benefit of U.S. Provisional Application No. 61/100,982, entitled "AUDIO/VIDEO ARCHIVING SYSTEM AND METHOD", and filed Sep. 29, 2008, which is hereby incorporated herein by reference in its entirety.

BACKGROUND

Broadcast audio/video distribution systems, such as cable broadcast television networks, satellite broadcast television systems, and the like, facilitate the delivery of hundreds of audio/video programming channels to millions of viewers in the United States, as well as many millions more worldwide. As a result, consumers currently enjoy unprecedented access to numerous audio/video programs, including, but not limited to, sporting events, news programs, motion pictures, television series episodes, and special presentations.

Given the enormous amount of audio/video content typically available through such a system, viewer complaints regarding the nature of the content often result. For example, charges of indecent, obscene, slanderous, or otherwise improper broadcast content are often leveled at the source and/or distributor of the content. Since much of this content is not replayed a second time over the same distribution system, access to verifiable proof of the nature of the content in question, such as a recording captured via a digital video recorder (DVR) or video cassette recorder (VCR), is often difficult to obtain despite the large number of potential consumers viewing the content at the time the content was aired.

To facilitate access to previously-aired content, some countries have enacted legislation requiring audio/video broadcast content distributors to maintain a reviewable copy of all content they have broadcast over some immediately preceding period of time, such as a few days or weeks, at all times. Currently, individual television stations, each of which is responsible for one, or perhaps two, audio/video streams, capture such information on an ongoing basis by recording their outgoing audio and video signals just prior to transmission. Although such recording is sometimes performed at a video resolution lower than what was originally broadcast, a significant amount of data is still involved. With such a requirement being imposed on cable and satellite television distributors, each of which may broadcast hundreds of channels, the vast amount of data required to be recorded at any particular point in time, as well as the total amount of storage necessary, is onerous.

BRIEF DESCRIPTION OF THE DRAWINGS

Many aspects of the present disclosure may be better understood with reference to the following drawings. The components in the drawings are not necessarily depicted to scale, as emphasis is instead placed upon clear illustration of the principles of the disclosure. Moreover, in the drawings, like reference numerals designate corresponding parts throughout the several views. Also, while several embodiments are described in connection with these drawings, the disclosure is not limited to the embodiments disclosed herein. On the contrary, the intent is to cover all alternatives, modifications, and equivalents.

DETAILED DESCRIPTION

The enclosed drawings and the following description depict specific embodiments of the invention to teach those skilled in the art how to make and use the best mode of the invention. For the purpose of teaching inventive principles, some conventional aspects have been simplified or omitted. Those skilled in the art will appreciate variations of these embodiments that fall within the scope of the invention. Those skilled in the art will also appreciate that the features described below can be combined in various ways to form multiple embodiments of the invention. As a result, the invention is not limited to the specific embodiments described below, but only by the claims and their equivalents.

Figure 1:
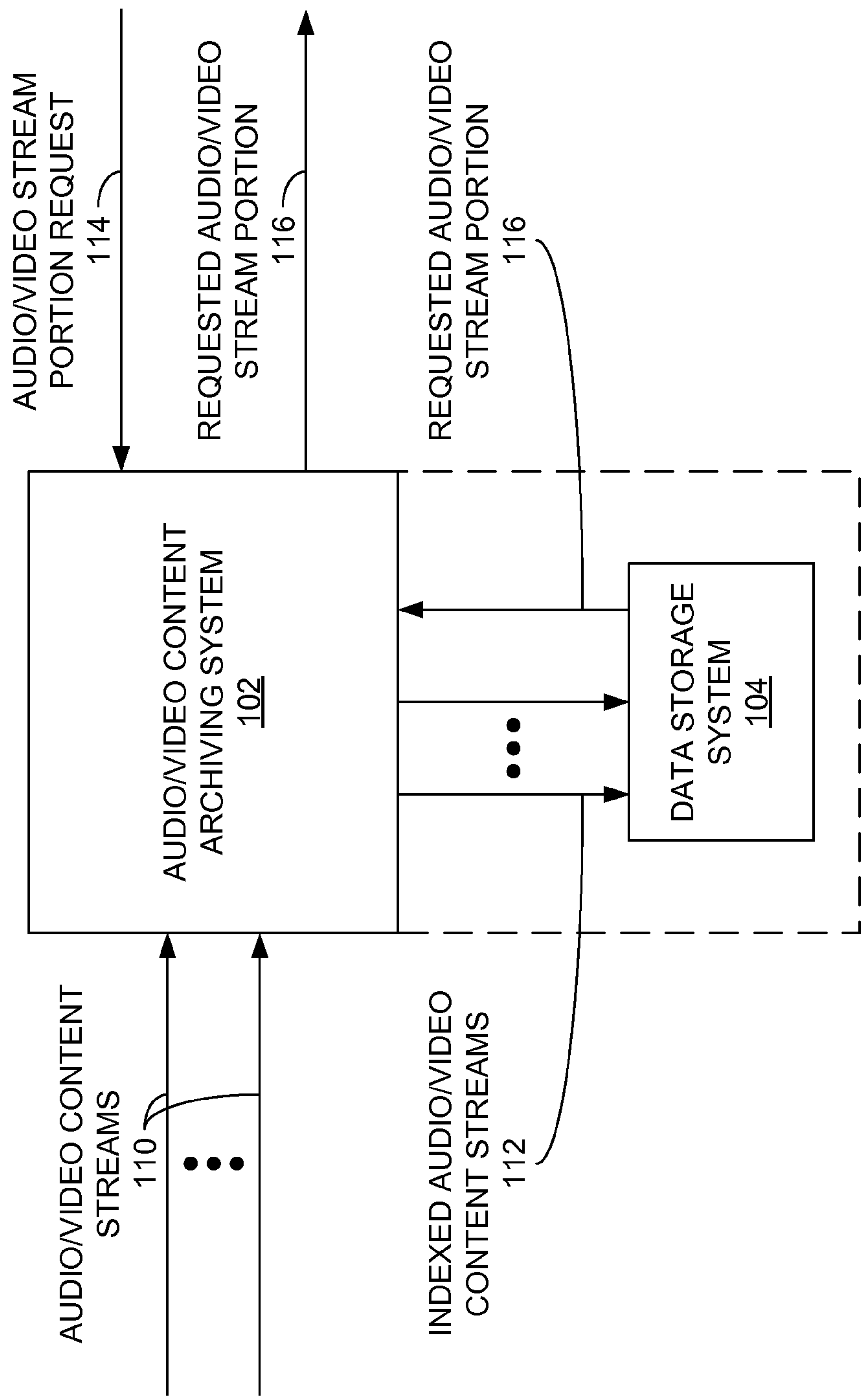
FIG. 1 is a block diagram of an audio/video content archiving system according to an embodiment of the invention.

FIG. 1 is a block diagram of an audio/video content archiving system 102 according to an embodiment of the invention. The audio/video content archiving system 102 is coupled with a data storage system 104 capable of storing the audio/video content for possible subsequent retrieval. While the data storage system 104 is shown in FIG. 1 as being incorporated with the audio/video content archiving system 102, the data storage system 104 may be supplied separately and coupled to the audio/video content archiving system 102 in other implementations.

The audio/video content may be any type of media content incorporating audio and/or video elements. Examples of the audio/video content include, but are not limited to, movies, news programs, sporting events, episodic programs, pay-per-view (PPV) events, and the like. The audio/video content may be broadcast via satellite, cable, or terrestrial ("over-the-air") means, transmitted over a peer-to-peer communication connection, transferred over an Internet Protocol (IP) or other communication network, or delivered in any other fashion to the user.

Figure 2:
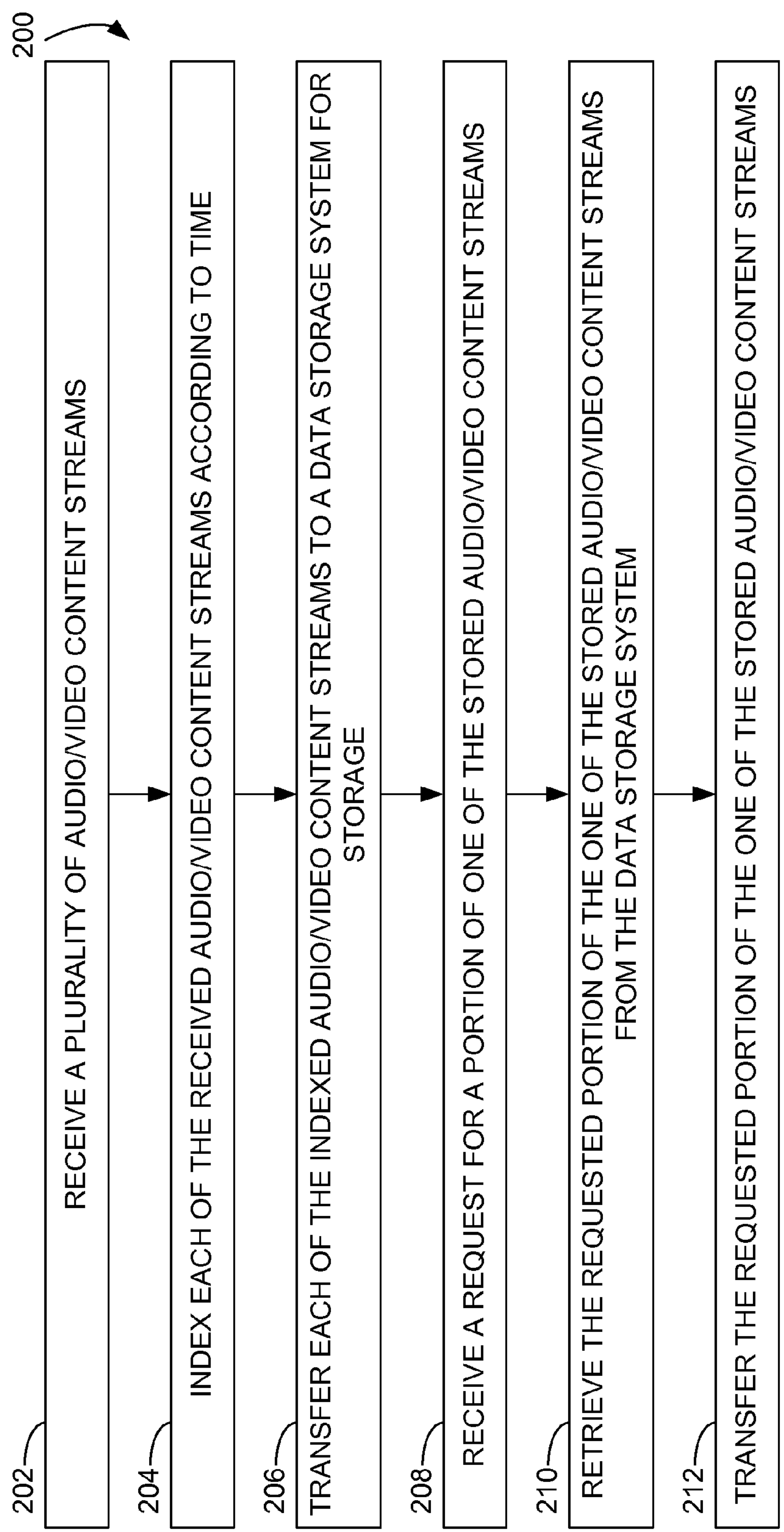
FIG. 2 is a flow diagram of a method according to an embodiment of the invention of archiving audio/video content.

FIG. 2 is a flow diagram describing a method 200 according to an embodiment of the invention for archiving audio/video content in the environment of the audio/video content archiving system 102 of FIG. 1. However, other audio/video content archiving systems other than that shown in FIG. 1 may serve as the platform for executing the various operations of the method 200 in other embodiments.

In the method 200 of FIG. 2, the audio/video content archiving system 102 receives a plurality of audio/video content streams 110 (operation 202). The audio/video content archiving system 102 indexes each of the received audio/ video content streams 110 according to time (operation 204). The archiving system 102 transfers each of these indexed audio/video content streams 112 to the data storage system 104 for storage (operation 206). The archiving system 102 receives a request 114 for a portion 116 of one of the stored audio/video content streams 112 (operation 208). In response to the request 114, the audio/video content archiving system 102 retrieves the requested portion 116 of the one of the stored audio/video content streams 112 from the data storage system 104 (operation 210) and transfers the requested portion 116 (operation 212). While FIG. 2 indicates a specific order of execution of the operations 202-212, other possible orders of execution, including concurrent execution of one or more operations, may be undertaken in other implementations. In another embodiment, a computer-readable storage medium may have encoded thereon instructions for a processor or other control logic to direct a device to implement the method 200.

Figure 3:
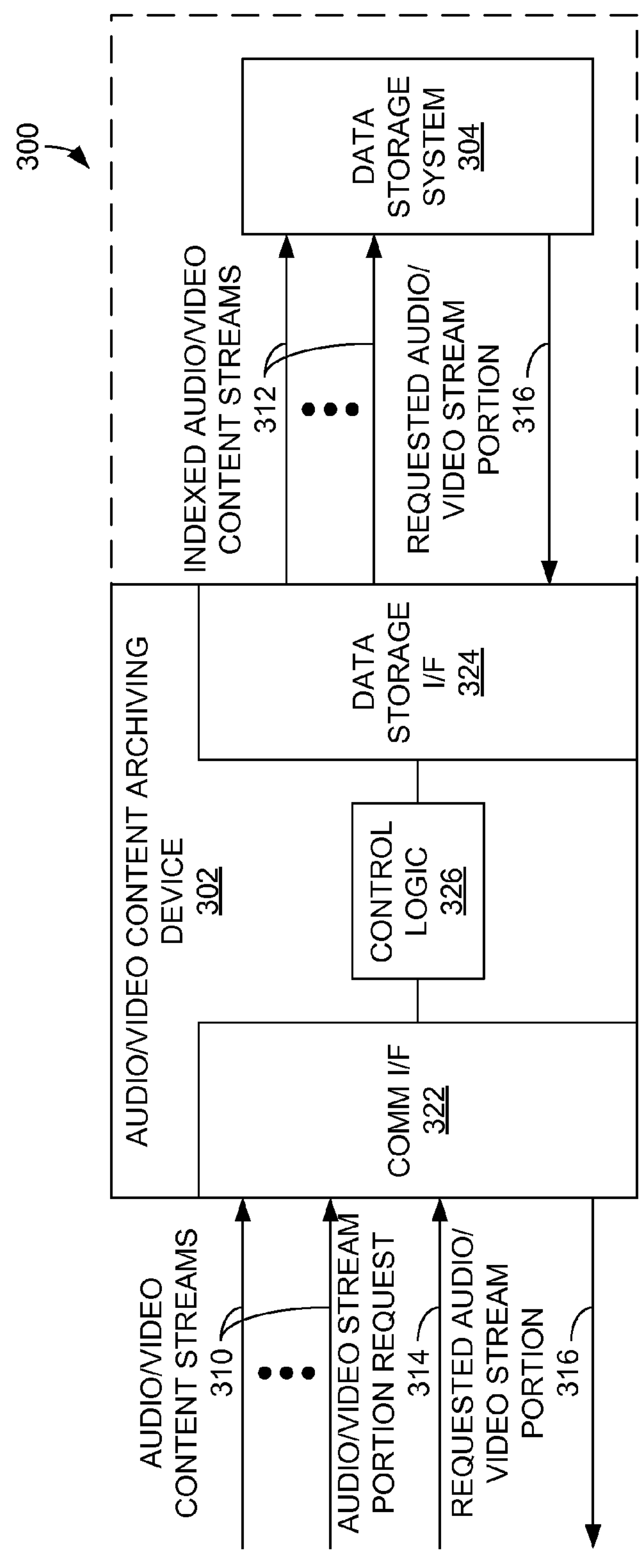
FIG. 3 is a block diagram of an audio/video content archiving device according to an embodiment of the invention.

An example of an audio/video content archiving device 302 serving as part of a larger audio/video content archiving system 300 according to one embodiment of the invention is illustrated in FIG. 3. The device 302 may be any standalone device, or may be incorporated in the form of software, firmware, and/or hardware elements into another device, such as a computer or communication device. The device 302 includes a communication interface 322, a data storage interface 324, and control logic 306. Also, a data storage system 304 is coupled with the data storage interface 324 of the archiving device 302. In one implementation, the data storage system 304 may be incorporated within, and thus considered a part of, the audio/video archiving device 302 in one implementation.

The communication interface 322 is configured to receive a plurality of audio/video content streams 310. The received audio/video content streams 310 may conform to any format capable of carrying audio and/or video information. In one example, each of the audio/video content streams 310 may be a video stream encoded according to one of the Motion Picture Experts Group (MPEG) standards, such as MPEG-2 or MPEG-4, although other video formats may be employed in other implementations. Further, each of these audio/video streams 310 may be transported by way of coaxial cable, such as by way of an asynchronous serial interface (ASI) protocol. In another embodiment, the audio/video content streams 310 are received over an Ethernet interface or other communication interface employing Internet Protocol (IP) or other protocol capable of transporting the streams 310. In addition, the communication interface 322 may be physically employed as a wired, wireless, optical, or other type of communication interface.

The data storage interface 324 of the audio/video content archiving system 302 may be any interface capable of delivering audio/video streams to, and retrieving at least portions of those streams from, the data storage system 304. In one example, the data storage interface 324 may by an IP interface coupled with a networked data storage system, such as a storage area network (SAN) or other data storage system employing an IP interface. Other interfaces capable of transporting data to and from a data storage system, such as the Small Computer System Interface (SCSI), may be utilized in other implementations. Furthermore, the data storage interface 324 may constitute a wired, wireless, optical, or other type of communication interface.

The data storage system 304 may be any data storage system capable or storing audio/video streams for later retrieval. In one example, the data storage system 304 may include one or more magnetic disk drives arranged in any configuration suitable for data storage and retrieval. In one example, the data storage system 304 may incorporate a redundant array of independent disks (RAID) storage system to facilitate fast, fault-tolerant disk storage. Other magnetic disk storage systems may be employed in further implementations. Additionally, other types of data storage, including, but not limited to, optical disk storage, magnetic tape storage, and solid state storage, such as flash memory, may be employed in lieu of, or in addition to, magnetic disk storage.

The control logic 326 of the archiving device 302 may include any control circuitry capable of performing the various tasks described below. For example, the control logic 326 may be one or more processors, such as a microprocessor, microcontroller, or digital signal processor (DSP), configured to execute instructions directing the processor to perform the functions discussed in detail below. In another implementation, the control logic 326 may be hardware-based logic, or may include a combination of hardware, firmware, and/or software elements.

Figure 4:
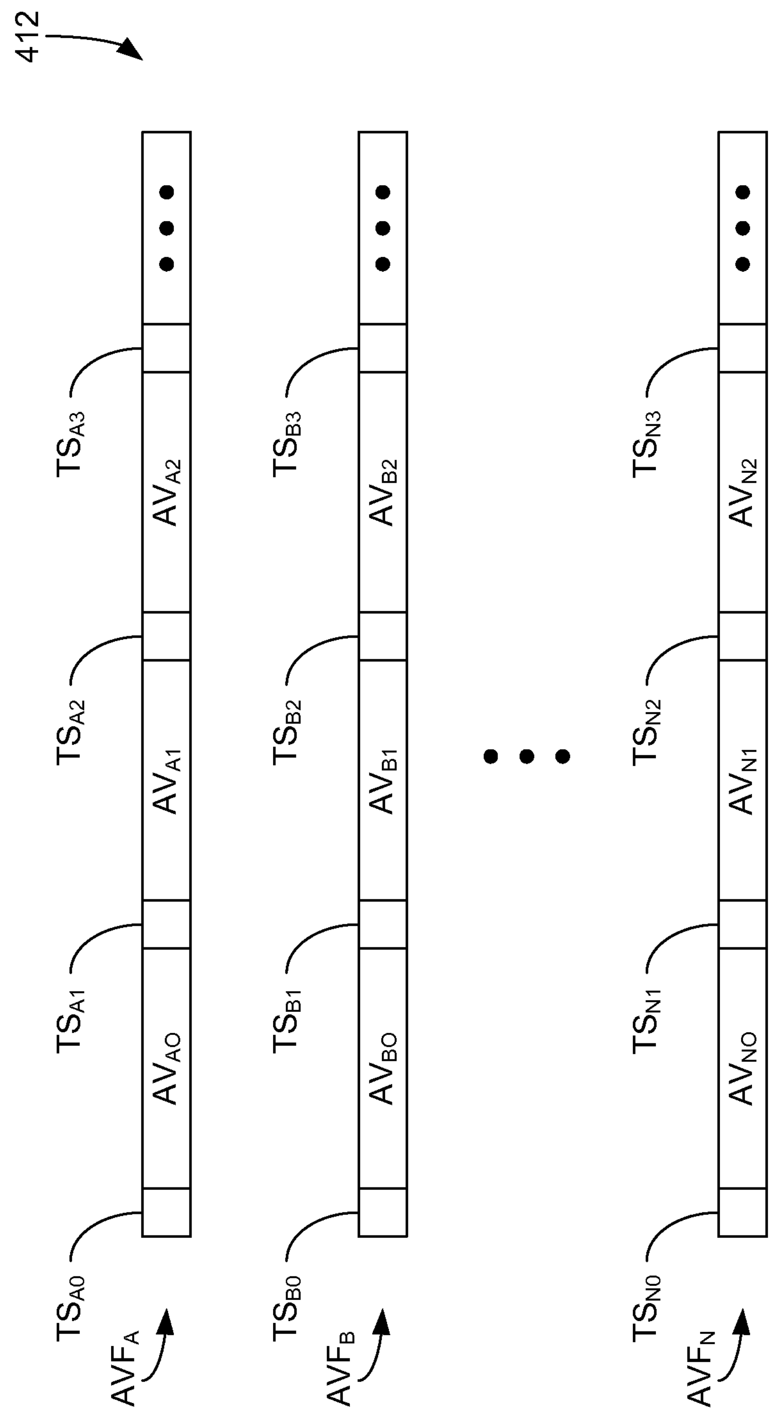
FIG. 4 is a graphical representation of an indexed audio/video content stream stored by the audio/video content archiving device of FIG. 3.

In operation, the control logic 326 is configured to index each of the received audio/video content streams 310 according to time, and to store each of these indexed audio/video content streams 312 in the data storage system 304 by way of the data storage interface 324. Such indexing aids in locating and retrieving a particular portion of one of the received audio/video context streams 310 upon request. FIG. 4 provides a graphical representation of an indexed audio/video content stream 412 according to one implementation. In this case, the control logic 326 has segmented the stream 412 into multiple audio/video files $AVF_A$, $AVF_B$, . . . , $AVF_N$ of approximately the same data length. In one example, each audio/video file AVF may be several gigabytes (GB) in size. Also, each of the audio/video files AVF may be named or labeled to indicate the source of the stream 412 (such as a channel name), as well as the particular segment of time associated with that portion of the stream 412. Further, the control logic 326 may store such information in a database, such as a file directory or catalog, to facilitate subsequent searching of the particular requested portion of the stream 412. In other embodiments, the audio/video content stream 312 may constitute a single audio/video file.

Each of the audio/video files AVF in FIG. 4 is further indexed by way of multiple timestamps TS located throughout the file AVF. For example, the first audio/video file $AVF_A$ includes a number of timestamps $TS_{A0}$, $TS_{A1}$, and so on. The remaining audio/video files AVF are similarly indexed. In one embodiment, each of the timestamps TS is a date/timestamp, indicating both the date and time associated with the following audio/video segment AV, wherein each of the audio/video segments AV may be encoded according to one of the MPEG standards, as noted above. The timestamps TS may instead incorporate other information identifying its particular audio/video segment AV, such as a program identifier and frame number, or some other designation. In this particular example, the first timestamp $TS_{A0}$ of the first audio/video file $AVF_A$ is associated with a first audio/video segment $AV_{A0}$, the second timestamp $TS_{A1}$ corresponds to the second audio/video segment $AV_{A1}$, and so forth. Again, the remaining audio/video files AVF are configured in a similar manner.

In a particular implementation, the timestamps TS incorporated within a particular audio/video file AVF may be evenly-spaced therebetween, resulting in each of the corresponding audio/video segments AV being approximately the same data length. Such an arrangement may facilitate faster searching and reading of the various timestamps TS within the audio/video file AVF during retrieval of a requested portion of the stored audio/video content stream 412.

Returning to FIG. 3, the control logic 326 of the archiving device 302 is further configured to receive a request 314 for a particular portion 316 of a previously indexed and stored audio/video content stream 312 by way of the communication interface 322. In one embodiment, the request 314 is received through the same connection of the communication interface 322 by which the audio/video content streams 310 are received. In another example, the communication interface 322 provides a different connection or port through which the request 314 may be received.

In one example, the request 314 indicates the particular programming channel or other source designation of the stored audio/video content stream 312 of interest, along with a starting time and time duration of that portion 316. Any other methods by which a particular portion 316 of a specific stored audio/video content stream 312 is indicated may be employed in other implementations.

Upon receiving the request by way of the communication interface 322, the control logic 326 retrieves the requested portion 316 of the selected audio/video content stream 312 from the data storage system 304 by way of the data storage interface 324. In the particular example of the indexed audio/video content stream 412 of FIG. 4, the control logic 326 may search a previously generated database, as described above, or preview the names of the audio/video files AVF themselves, to ascertain which of the one or more files AVF contains the requested portion 316 of the audio/video stream 412 in question. In one embodiment, the control logic 326 may then transfer the audio/video content within each of the identified audio/video files AVF over the communication interface 322 to a client device (not shown in FIG. 3), such as the client responsible for issuing the request 314.

In another example, the control logic 326 may search and review at least some of the timestamps TS of the identified audio/video files AVF of the selected audio/video content stream 314 to more specifically determine the extent of the requested portion 316 to reduce the amount of audio/video data subsequently transferred over the communication interface 322 to a client. The control logic 326 may then transfer only those portions of the audio/video files AVF corresponding to the requested portion 316 of the selected audio/video stream 314 over the communication interface 322.

The communication interface 322 may transfer the requested audio/video stream portion 316 over the same port or connection by which the request 314 was received, although the transfer of the portion 316 may not be limited in such a manner. In another implementation, the requested audio/video stream portion 316 may be transferred using the same pathways of the communication interface 322 utilized by the received audio/video streams 310. Also, the control logic 326 may remove any timestamps TS or other indexing data that were stored with the requested audio/video portion 316 on the data storage system 304 prior to transferring the requested portion 316 over the communication interface 322.

The control logic 326 may employ any of a number of methods for transferring the requested audio/video stream portion 316. In one example, the control logic 326 may use the communication interface 322 to transfer to a client a separate audio/video content stream encompassing only the requested audio/video stream portion 316. Such a method may be advantageous in the case the client possesses no or limited buffer space for storing the requested portion 316 prior to presentation to a user. In another example, the control logic 326 may cause the communication interface 322 to transfer the requested audio/video content portion 316 as one or more audio/video files to the client, which may then buffer all or parts of the requested portion 316 prior to displaying the audio/video portion 316 to a user.

Figure 5A:
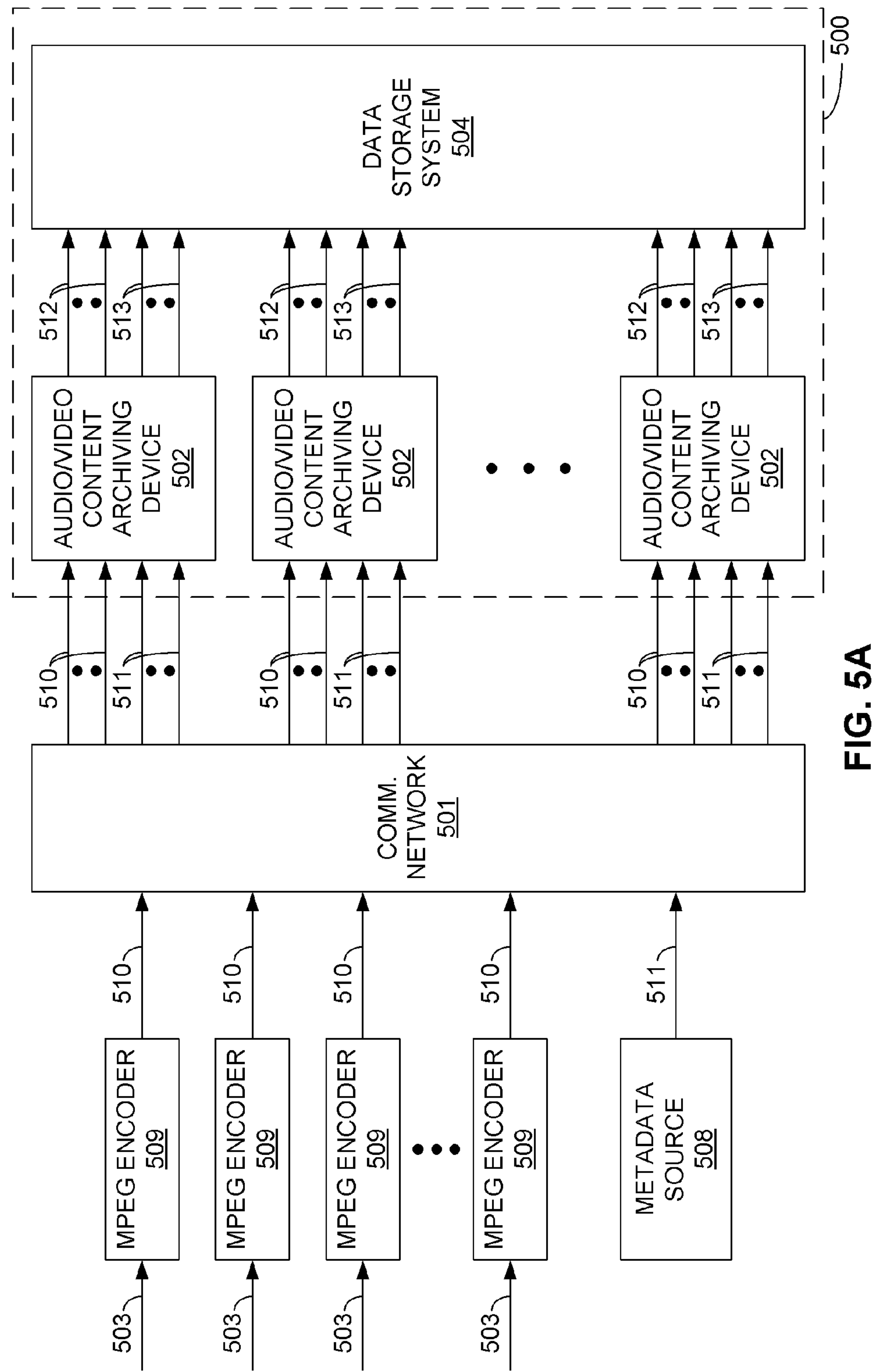
FIG. 5A is a block diagram of an indexed audio/video content archiving system during an archiving phase according to an embodiment of the invention.
Figure 5B:
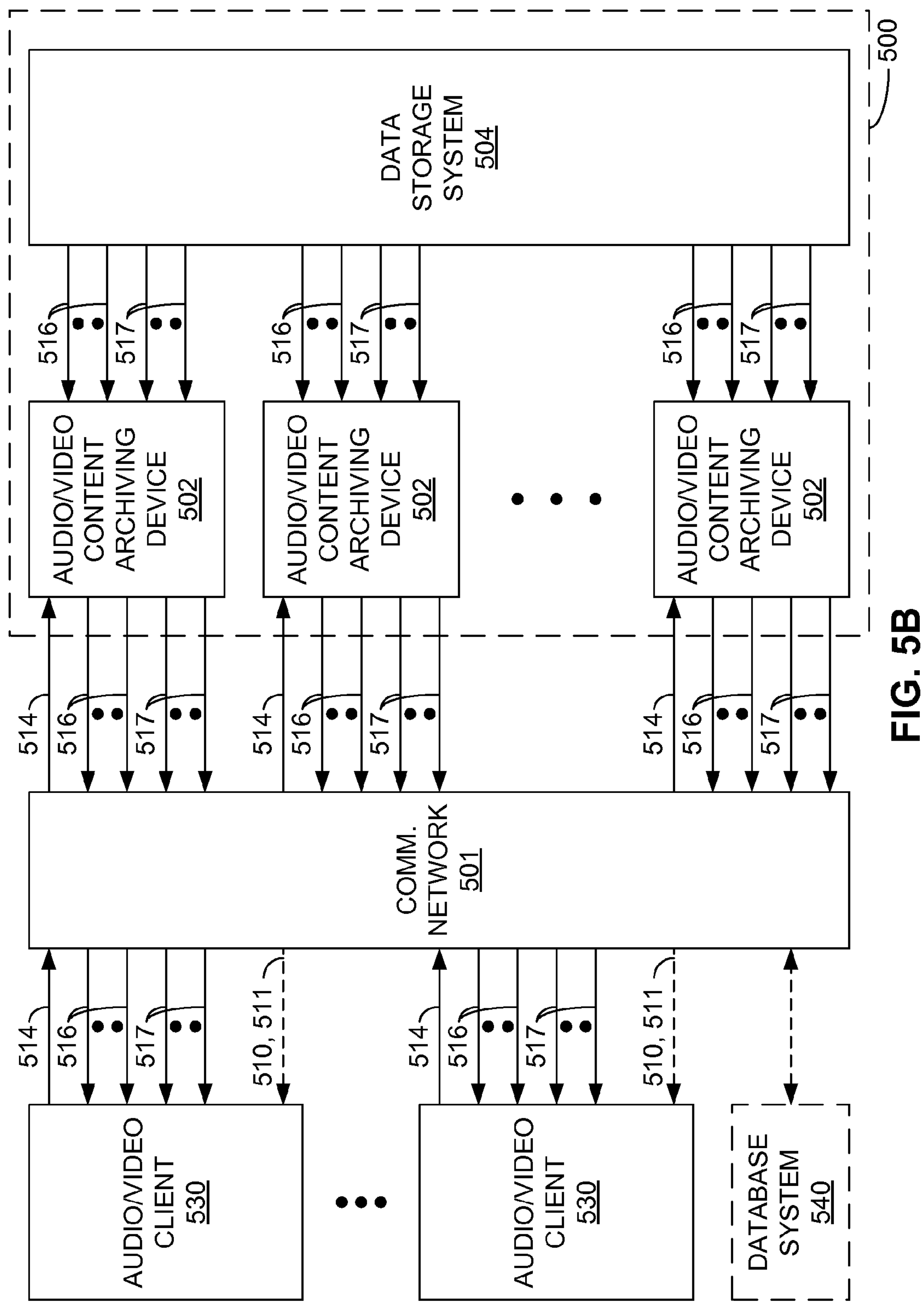
FIG. 5B is a block diagram of the indexed audio/video content archiving system of FIG. 5A during a retrieval phase according to an embodiment of the invention.

FIGS. 5A and 5B depict another embodiment of the invention: an audio/video content archiving system 500 including a number of audio/video archiving devices 502, an example of which is the archiving device 302 of FIG. 3. While the archiving system 500 of FIGS. 5A and 5B employ at least three archiving devices 502, one or more archiving devices 502 may be employed in other system embodiments. The archiving system 500 further employs a data storage system 504, similar to the data storage system 304 of FIG. 3 described above. FIG. 5A describes the reception and storage of a plurality of audio/video content streams, while FIG. 5B illustrates the retrieval and transmission of selected portions of the previously stored streams, similar to the process described above regarding FIG. 3.

In one example, an audio/video distribution center employs the audio/video content archiving system 500 to capture and store an audio/video stream associated with each programming channel distributed by the distribution center for possible subsequent retrieval. Examples of an audio/video distribution center include a satellite uplink center for a satellite television broadcast system, such as a direct broadcast satellite (DBS) system. A satellite uplink center typically receives numerous audio/video programming channels from various sources, such as major broadcasting networks, pay television services, and the like, by way of satellite link, terrestrial link, and so on. The satellite uplink center then distributes these signals by way of one or more satellites to parabolic antennas and associated receivers utilized by subscribers to receive the programming. Another example of such a distribution center is a cable television provider facility, which typically distributes its television signals to its customer via coaxial cable.

In the specific example of FIG. 5A, each of multiple MPEG audio/video encoders 509 produces an audio/video content stream 510. Each of the encoders 509 may receive an unencoded, uncompressed audio/video stream 503 from a content source (not shown in FIG. 5A), such as a television programming network. In one example, the audio/video stream 503 is transported to its corresponding encoder 509 using a serial digital interface (SDI) often employed by broadcasters for transfer of uncompressed audio/video signals. Each of the encoders 509 encodes the received uncompressed stream into an MPEG audio/video content stream 510 for subsequent transmission to subscribers. As shown in FIG. 5A, each of these streams 510 is also transferred over a communication network 501 to the audio/video content archiving system 500. The communication network 501 may include ASI audio/video connections, IP connections, or wired, wireless, or optical means of transporting the streams 510 to the archiving system 500. Further, the communication network 501 may include various components, such as communication switches, routers, and the like; such components are not depicted or discussed further herein to simplify the discussion provided below.

Typically, each of the encoded audio/video content streams 510 may be received by exactly one of the audio/video archiving devices 502 of the archiving system 500, although receipt of a stream 510 by two or more device 502 may be undertaken to facilitate redundancy in storage of the stream 510. In the case of an IP connection, the audio/video content streams 510 may be transferred using an IP multicast protocol. Such a protocol would allow each of the audio/video content archiving devices 502 to subscribe to a particular subset of the encoded streams 510, and thus ignore the remaining streams 510. Other types of communication connections, such as point-to-point or broadcast connections, using ASI, IP, or other communication protocols, may be employed in other implementations.

In one implementation, the number of audio/video content archiving devices 502 may be determined in part by the number of audio/video content streams 510 to be indexed and stored. As a result, the overall size of the archiving system 500 may be closely tailored, and subsequently increased or decreased incrementally, to efficiently archive a large and changing number of content streams 510 by altering the number of archiving devices 502 employed in the system 500.

Each of the audio/video content archiving devices 502 may index the encoded audio/video content streams 510 it receives as described in detail above with respect to the device 302 of FIG. 3. Each of the devices 502 may also store the resulting indexed streams 512 in the data storage system 504 in a fashion similar to that discussed above with respect to the archiving device 302 and associated data storage system 304 of FIG. 3.

In one example, the audio/video archiving system 500 is configured to index and store the most recent audio/video content streams 510 and related metadata streams 511. As a result, once the data storage system 504 is filled with streams 512 previously stored, each of the archiving devices 502 may be adapted to overwrite the earliest of the previously-stored streams 512, as if the data storage system 504 were fashioned in a first-in, first-out (FIFO) configuration. Also, in some implementations, the indexed audio/video content streams 512 may be stored in a lower resolution than what was originally received from the MPEG encoders 509, or otherwise compressed or transcoded, in order to conserve storage space in the data storage system 504. However, such data compression is not required.

In one embodiment, other data streams, such as metadata streams 511 associated with the encoded audio/video content streams 510, may be transferred to at least one of the audio/video content archiving devices 502 via the communication network 501 as described above in conjunction with the audio/video content streams 510. Each archiving device 502 receiving the metadata streams 511 may then index and store the metadata streams in the data storage system 504 in a fashion similar to that employed for storing the indexed audio/video content streams 512.

One example of the metadata streams 511 may include data associated with an electronic program guide (EPG) supplied to subscribers of the audio/video streams 510 for locating, viewing, and recording programs of interest to the subscribers. Another possible type of metadata stream 511 may be channel lookup information associated with each of the audio/video content streams 510. For example, the channel lookup information for a particular stream 510 may include an identification of the particular satellite, the specific transponder of the satellite, and the particular frequency or bandwidth associated with the specific transponder, which carries the associated audio/video content stream 510. As shown in FIG. 5A, a metadata source 508 produces the metadata streams 511. In one example, the metadata source 508 may include one or more digital video broadcasting (DVB) tables containing the information. Other metadata, such as subscriber or access security information, may also be incorporated within the metadata streams 511.

In one implementation, each audio/video content archiving device 502 receiving one of the metadata streams 511 may index and store the metadata stream 511 as an indexed metadata stream 513 separately from the indexed audio/video content streams 512. Under another scenario, the metadata streams 511 may be integrated or incorporated within one or more associated indexed audio/video content streams 512. In using this latter method, an indexed audio/video content stream 512 and associated metadata stream 511 may both be searched and retrieved using the same indexes, such as the timestamps TS depicted in FIG. 4.

FIG. 5B is a block diagram of the audio/video content archiving system 500 depicted during request and retrieval operations. While the reception/storage aspects of the archiving system 500 are illustrated separately from its request/retrieval operations, the system 500 typically provides both sets of functions illustrated in FIGS. 5A and 5B simultaneously or concurrently.

In FIG. 5B, each of one or more audio/video clients 530 are configured to issue one or more requests 514 via the communication network 501 to the archiving system 500 for portions of previously stored audio/video content streams 512 and/or metadata streams 513. Such a request 514 may be issued to review a specific portion of an audio/video content stream 512, a related metadata stream 513, or both, previously broadcasted during a particular time period, as described earlier. In some cases, the request may be initiated by a subscriber of the content stream 512, 513, a governmental entity, or another organization or individual.

In one embodiment, the request 514 is issued to one of the audio/video content archiving devices 502 of the system 500. In turn, the device 502 receiving the request 514 may consult a previously-generated database or catalog residing therewithin as to the location of the requested portion 516 of the audio/video content stream or the requested portion 517 of the metadata stream selected by the request 514. The requested portion 516, 517 may be accessible by way of the audio/video content archiving device 502 receiving the request 514, or via another of the devices 502 by way of the request 514 being forwarded to the device 502 providing access to the requested segment 516, 517.

In another implementation, the request 514 transmitted over the communication network 501 may be forwarded to all of the archiving devices 502 substantially simultaneously. Each of the archiving devices 502 may then consult its own database or catalog to determine if the device 502 originally received, indexed, and stored the stream associated with the requested 514. The archiving device 502 having access to that stream may then retrieve the requested portion 516, 517 of the stream from the data storage system 504 and transfer the portion 516, 517 by way of the communication network 501 to the audio/video client 530 initiating the request 514.

According to yet another example, the audio/video client 530 may transfer the request 514 to a separate database system 540 by way of the communication network 501. The database system 540 contains a database indicating the location of the various indexed streams 512, 513 within the data storage system 504. Each of the content archiving devices 502 may be responsible for generating a portion of the database corresponding to the streams 512, 513 it has stored to the data storage system 504. Upon receiving the request 514, the database system 540 may then determine which archiving device 502 in the system 500 would have access to the requested portion 516, 517 of the stream, and forward that request to the appropriate device 502.

In each case described above, one of the archiving devices 502 retrieves the requested portion 516, 517 of the selected stream, which may be stored in the data storage system 504 within one or more audio/video files AVF (as shown in FIG. 4), transfer the requested portion 516, 517 over the communication network 501 to one of the audio/video clients 530, such as the one originating the request 514. Such a transfer may occur as described above in connection with the audio/ video archiving device 302 of FIG. 3. Prior to transferring the requested portion 516, 517, the archiving device 502 performing the transfer may remove any timestamps TS or other overhead information not originally contained with the associated received stream 510, 511.

In one implementation, the audio/video client 530 may receive the requested stream portion 516, 517 as an IP stream, such as by way of an IP multicast protocol, a broadcast stream, a point-to-point connection, or other communication means. In particular, the use of an IP multicast system allows each client 530 to subscribe to, and subsequently receive, a particular requested portion 516, 517 of a selected audio/video content or metadata stream. If, instead, the client 530 is configured to accept and buffer some or all of the requested portion 516, 517, the archiving device 502 responsible for transferring the requested portion 516, 517 may transfer that information in one or more distinct files over the network 501 to the target client 530.

Optionally, one of the audio/video clients 530 may receive one or more of the audio/video content streams 510 and/or metadata streams 511 over the communication network 501 as they are being received by the archiving system 500. As is the case with the archiving devices 502, each client 530 may receive the streams 510, 511 by a point-to-point connection, a broadcast connection, or a multicast connection, such as that often employed in an IP network. In the case of multicasting, the client 530 may subscribe to the streams 510, 511 of interest in a manner similar to that performed by the archiving devices 502, as described above.

Figure 6:
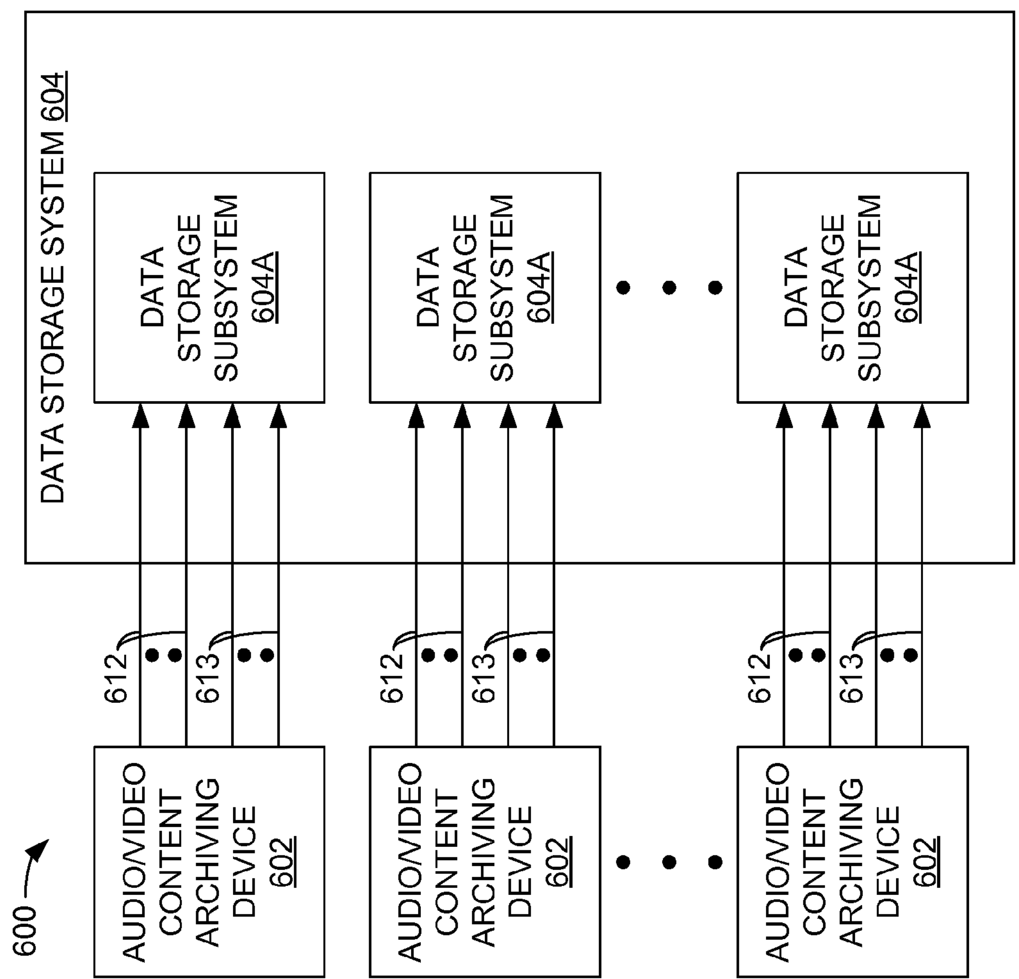
FIG. 6 is a block diagram of an indexed audio/video content archiving system according to another embodiment of the invention.

FIG. 6 provides an implementation of a data storage system 604 similar to the data storage system 504 of FIGS. 5A and 5B. In FIG. 6, the data storage system 604 includes at least one data storage subsystem 604A that is specifically associated with each of a plurality of archiving devices 602 residing with a larger archiving system 600. In this arrangement, each of the data storage subsystems 604A receives indexed audio/video streams 612 and associated metadata streams 613 from the single archiving device 602 with which the storage subsystem 604A corresponds. As a result, little or no communication between the data storage subsystems 604A is necessary, possibly streamlining communications between each storage subsystem 604A and its associated archiving system 602. In another arrangement, the various data storage subsystems 604A may be communicatively coupled together so that any archiving device 602 may process requests for any stream portion stored within the data storage system 604. Also, under such an arrangement, one or more data storage subsystems 604A may provide spare or redundant capacity for another storage subsystem 604A to protect against a failure of a single data storage system 604A resulting in the loss of information within one or more of the stored streams.

At least some embodiments as described herein for archiving audio/video content streams and related metadata streams may provide a number of benefits. In general, the content streams may be stored for later retrieval as encoded immediately prior to transmission of the streams to the subscriber or end user. As a result, re-encoding or transcoding of the stream specifically for storage is not necessary, thus eliminating a processing step often employed in other audio/video archiving devices. Further, by storing the streams at the same resolution or compression ratio as provided to the subscribers, the saved content will be the same as that experienced by the subscriber. Also, systems in which multiple audio/video content archiving devices are employed within a single archiving system may allow a content distributor to easily scale the size and cost of the archiving system to their particular needs, both now and in the future.

While several embodiments of the invention have been discussed herein, other implementations encompassed by the scope of the invention are possible. For example, while various embodiments have been described primarily within the context of satellite and cable audio/video content providers or distributors for onsite archival of distributed content, other entities that either distribute or receive multiple content streams containing any or all of audio, video, or some other information stream in a real-time fashion may benefit from application of the various concepts described herein. For example, satellite or cable radio transmissions may be stored for subsequent retrieval by employing at least some of the concepts provided herein. In another implementation, telemetry or mapping information streams received by way of satellite or other communication means may be stored and retrieved by employing several aspects of the embodiments discussed above. In addition, aspects of one embodiment disclosed herein may be combined with those of alternative embodiments to create further implementations of the present invention. Thus, while the present invention has been described in the context of specific embodiments, such descriptions are provided for illustration and not limitation. Accordingly, the proper scope of the present invention is delimited only by the following claims and their equivalents.

What is claimed is:

1. A method utilizing at least one computing device for archiving audio/video content, the method comprising:

concurrently receiving from a broadcast audio/video distribution center a first plurality of audio/video content streams, wherein each of the received first plurality of audio/video content streams correspond to one of a second plurality of audio/video content streams that are being broadcasted over a broadcast audio/video distribution system to a plurality of subscribers;

indexing each of the received first plurality of audio/video content streams according to time of broadcast of the corresponding second plurality of audio/video content streams to the plurality of subscribers, wherein indexing each of the received first plurality of audio/video content streams comprises:

segmenting each of the received first plurality of audio/video content streams into a series of audio/video segments, wherein each of the series of audio/video segments for each one of the first plurality of audio/video content streams are approximately the same data length; and locating, for each one of the first plurality of audio/video content streams, a timestamp between each segment of the series of audio/video segments, wherein the timestamp identifies a time of broadcast of a corresponding portion of the respective one of the broadcasted second plurality of audio/video content streams that corresponds to the audio/video segment that is after the timestamp;

transferring each of the indexed audio/video content streams to a data storage system for storage;

storing each of the indexed audio/video content streams in the data storage system;

after the broadcasting of the second plurality of audio/video content streams to the plurality of subscribers, receiving a request from a requesting party for a portion of a specified one of the second plurality of broadcasted audio/video content streams, wherein the request specifies a time period of broadcast for the specified one of the second plurality of broadcasted audio/video content streams;

identifying in the indexed audio/video content stream corresponding to the specified one of the second plurality of broadcasted audio/video content streams a corresponding at least one of the stored indexed audio/video segments that follows a timestamp that corresponds to the specified time period of the broadcast of the requested portion of the specified one of the second plurality of broadcasted audio/video content streams;

retrieving a respective audio/video segment following the identified timestamp of the one of the stored first plurality of audio/video content streams from the data storage system, wherein the retrieved respective audio/video segment corresponds to the requested portion of the specified one of the second plurality of broadcasted audio/video content streams; and transmitting the retrieved audio/video segment to the requesting party.

2. The method of claim 1, further comprising:

generating a database indicating a location within the data storage system of each of the stored indexed audio/video content streams;

wherein the retrieving of the respective audio/video segment corresponding to the requested portion of the one of the second plurality of broadcasted audio/video content streams is based on the database.

3. The method of claim 1, wherein the received first plurality of plurality of audio/video content streams from the broadcast audio/video distribution center are non-encoded, non-compressed audio/video content streams, and the method further comprising:

encoding each of the received non-encoded, non-compressed first plurality of audio/video content streams into a corresponding first plurality of encoded audio/video content streams; and compressing each of the first plurality of encoded audio/video content streams into a corresponding first plurality of encoded and compressed audio/video content streams.

4. The method of claim 1, wherein:

each of the received first plurality of audio/video content streams comprises an asynchronous serial interface stream.

5. The method of claim 1, further comprising:

subscribing, by at least one user, to each of the received first plurality of audio/video content streams;

wherein each of the received first plurality of audio/video content streams comprises a multicast audio/video content stream.

6. The method of claim 1, further comprising:

receiving metadata associated with at least one of the received first plurality of audio/video content streams.

7. The method of claim 6, further comprising:

integrating the received metadata with at least one of the indexed first plurality of audio/video content streams; and transferring the at least one of the indexed first plurality of audio/video content streams to the data storage system for storage.

8. The method of claim 6, further comprising:

indexing the received metadata to at least one of the indexed first plurality of audio/video content streams; and transferring the indexed metadata to the data storage system for storage.

9. The method of claim 6, wherein:

the received metadata comprises at least one of electronic program guide information, channel lookup information, subscriber information, and security information.

10. The method of claim 1, wherein:

the transmitted retrieved audio/video segment of the stored first plurality of audio/video content streams is transferred as a multicast audio/video steam.

11. The method of claim 1, wherein:

the second plurality of audio/video content streams are not indexed with the timestamps.

12. The method of claim 1, wherein:

the broadcasting is subsequent to the transferring of each of the indexed audio/video content streams to the data storage system for storage.

13. The method of claim 1, wherein:

the request for a portion of one of the broadcasted audio/video content streams associated with a time period of the broadcast of the broadcasted audio/video content streams includes the associated time stamp that identifies the time period of broadcast.

14. An audio/video content archiving device, comprising:

a communication interface configured to concurrently receive at least one of a first plurality of audio/video content streams from a plurality of different content sources, wherein the at least one of the first plurality of audio/video content streams corresponds to one of a plurality of second plurality of audio/video content streams broadcasted over a broadcast audio/video distribution system to a plurality of subscribers;

a data storage interface communicatively coupled to the communication interface, and configured to store the received at least one of the first plurality of audio/video content streams; and control logic configured to:

segment the received at least one of the first audio/video content streams into a series of audio/video segments, wherein each of the series of audio/video segments are approximately the same data length;

index each of the segmented audio/video content streams by locating a timestamp between each of the audio/video segments, wherein each timestamp identifies a time of broadcast of a respective portion of the respective second plurality of audio/video content streams that are broadcasted to the plurality of subscribers, wherein the timestamp is followed by the respective portion; and transfer each of the indexed audio/video content streams for storage by way of the data storage interface; and a data storage system coupled with the data storage interface;

wherein the data storage system is configured to store the indexed audio/video content streams transferred by the control logic, wherein the audio/video content archiving device is configured to receive a request from a requesting party for a portion of a specified one of the broadcasted second plurality of audio/video content streams, wherein the request specifies at least a time period of the broadcast of the broadcasted second plurality of audio/video content streams to the plurality of subscribers; and wherein the control logic is further configured to:

identify, in a corresponding one of the stored indexed first plurality of audio/video content streams, a timestamp that corresponds to the requested time period of the broadcast of the requested portion of one of the broadcasted second plurality of audio/video content streams;

retrieve a respective audio/video segment following the identified timestamp that corresponds to the requested portion of the one of the stored audio/video content streams; and transmit the retrieved audio/video segment over the communication interface to the requesting party.

15. The device of claim 14, wherein:

the control logic is configured to generate a database indicating a location of the stored indexed first plurality of audio/video content streams, and to use the database to retrieve the respective audio/video segment corresponding to the requested portion of the second plurality of audio/video content streams.

16. The audio/video content archiving device of claim 14, wherein the received plurality of audio/video content streams received from the plurality of content sources are non-encoded, non-compressed audio/video content streams, and further comprising:

a plurality of encoders, wherein each encoder receives one of the received non-encoded, non-compressed audio/video content streams, and wherein each encoder encodes and compresses the received non-encoded, non-compressed audio/video content stream into a corresponding encoded and compressed audio/video content stream that is stored in the data storage system.

17. The device of claim 14, wherein:

the broadcast plurality of audio/video content streams are indexed with the timestamps, and the request for the portion of one of the broadcasted one of the plurality of second audio/video content streams associated with a time period of the broadcast of the broadcasted plurality of second audio/video content streams includes the associated timestamp that identifies a respective time period of broadcast of the associated portion of the second audio/video segment.

18. An audio/video content archiving system, comprising:

audio/video content archiving devices, wherein each of the audio/video content archiving devices comprises:

a communication interface configured to concurrently receive at least one of a plurality of first audio/video content streams, wherein the at least one of the first plurality of audio/video content streams corresponds to one of a plurality of second audio/video content streams that are broadcasted over a broadcast audio/video distribution system to a plurality of subscribers;

a data storage interface communicatively coupled to the communication interface, and configured to store the received at least one of the first plurality of audio/video content streams; and control logic configured to:

segment the received at least one of the first plurality of audio/video content streams into a series of audio/video segments, wherein each audio/video segment is of approximately equal data size;

index each of the segmented audio/video content streams by locating a timestamp between each of the audio/video segments, wherein each respective timestamp identifies a time of broadcast of a portion of the respective one of the second plurality of audio/video content streams that corresponds to the audio/video segment that follows the timestamp; and transfer the indexed at least one of the first plurality of audio/video content streams for storage using the data storage interface; and a data storage system communicatively coupled to the storage interface, wherein the data storage system is configured to store the indexed at least one of the first plurality of audio/video content streams transferred by the control logic, wherein the audio/video content archiving system is further configured to receive a request from a requesting party for a portion of one of the stored indexed first plurality of audio/video content streams audio/video content streams based upon a time period of broadcast of the corresponding second one of the plurality of audio/video content streams that was broadcast to the plurality of subscribers; and wherein the control logic is further configured to:

identify, in a corresponding stored indexed at least one of the first plurality audio/video content streams, a timestamp that corresponds to the requested time period of broadcast of the broadcasted second one of the plurality of audio/video content streams;

retrieve the respective audio/video segment following the identified timestamp that corresponds to the requested portion of the stored indexed at least one of the first plurality of audio/video content streams; and transmit the retrieved audio/video segment over the communication interface to the requesting party.

19. The system of claim 18, wherein:

the control logic of each of the audio/video content archiving devices is configured to generate a database indicating a location of each of the stored audio/video content streams stored in the data storage system coupled with a corresponding audio/video content archiving device, wherein the control logic retrieves the audio/video segment corresponding to the requested portion of the one of the stored audio/video content streams based on the database.

20. The system of claim 19, wherein:

the control logic of each of the audio/video content archiving devices is configured to transfer at least a portion of the database to another of the audio/video content archiving devices.

21. The system of claim 18, wherein:

the broadcast plurality of second audio/video content streams broadcasted to the plurality of subscribers are indexed with the timestamps, and the request for the portion of the one of the broadcasted plurality of second audio/video content streams associated with the time period of the broadcast includes an associated timestamp that identifies the time period of broadcast of the associated portion of the second audio/video segment.

* * * * *